Patented Aug. 10, 1943

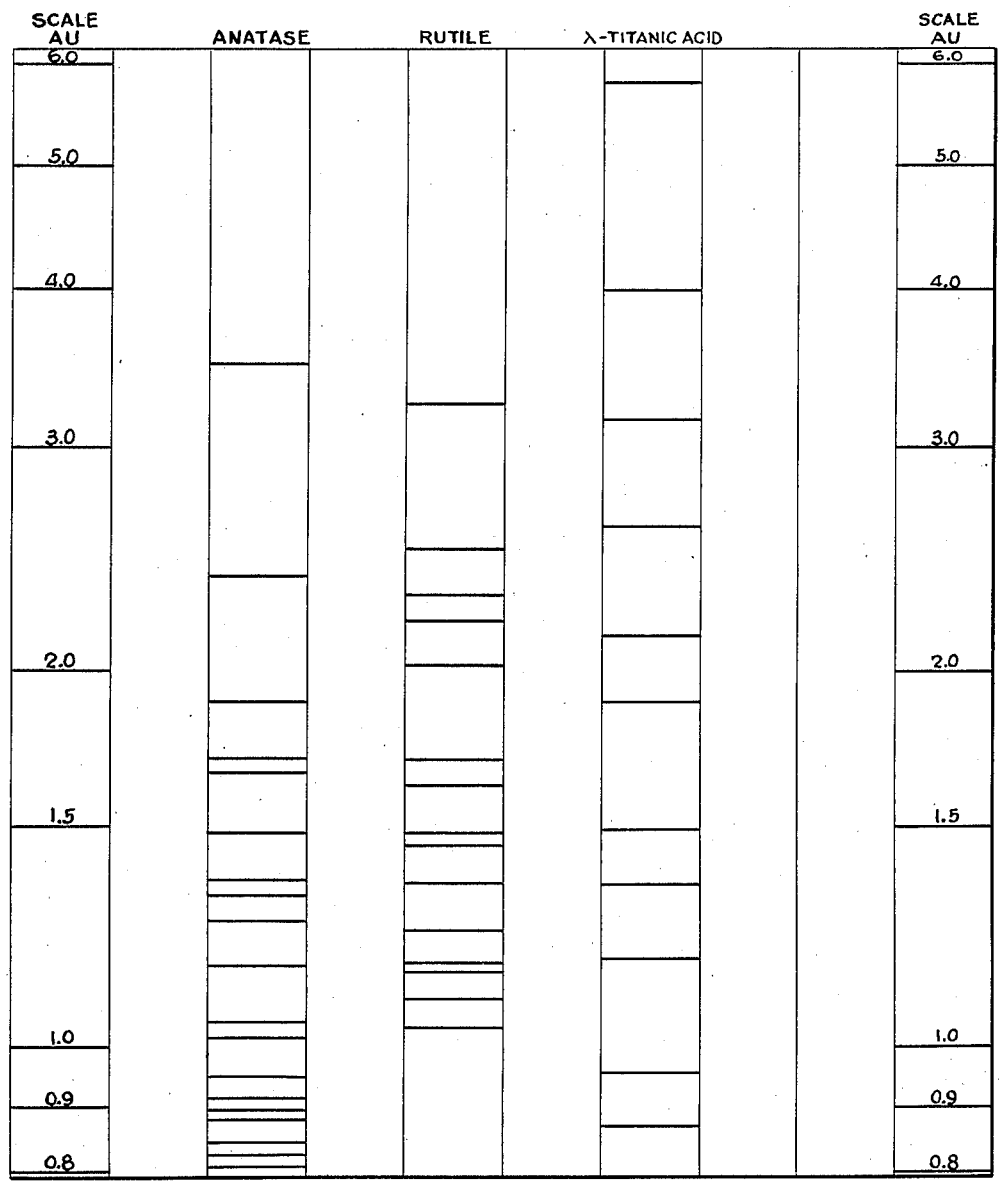

2,326,156

UNITED STATES PATENT OFFICE 2,326,156

PROCESS OF MAKING TITANIUM CONTAINING PIGMENTS

Andrew T. McCord, Collingswood, N. J., assignor to The Sherwin-Williams Company, a corporation of Ohio Application August 1, 1940, Serial No. 349,345

11 Claims. (Cl. 106—300)

This invention relates to titanium pigments of the type comprising titanium oxide and a so-called "extender," and which are useful in paint and other liquid coating compositions and for various other purposes.

Heretofore it has been the practice to use a solution of titanium sulfate in sulfuric acid, and which has been obtained by the treatment of ilmenite or other titaniferous ores with sulfuric acid, and to precipitate the titanium as titania hydrate by thermal hydrolysis in the presence of the extender by boiling. The mixture of the extender and such hydrate is then calcined to drive off the sulfuric radical and convert the hydrate into pigmentary titanium oxide.

My improved product possesses a substantially greater tinting strength and hiding power for a given titanium oxide content than have other composite titanium oxide pigments heretofore available to the trade and having the same percentage of titanium oxide. It is also less sensitive to water, has superior brightness and resistance to chalking in paint films on exterior exposures, and greater film strength.

My improved process for making the pigment involves certain novel and important steps.

As an important novel feature of my improved pigment, the titanium oxide constituent has a rutile crystalline structure instead of the crystalline structure of anatase, and as an important feature of the process the pigment is formed from the extender and a certain form of titanium hydrate, both in solid form, in an acidified slurry which is heated to convert the titanium hydrate to the desired crystalline form and from which the solids in intimately mixed, very finely divided form, may be readily separated and thereafter calcined.

The titania hydrate which I employ differs in crystalline structure from hydrates produced by the sulfuric acid process and by various other processes commercially used or known in the art. It is characterized by producing upon X-ray analysis, a band pattern, the bands corresponding in position to neither those of rutile nor those of anatase. It is distinguished from the band pattern of the hydrate produced by the sulfate process and obtained by thermal hydrolysis of a sulfate solution, wherein the bands correspond in position to the characteristic anatase lines, and is also distinguished from the band pattern produced by thermal hydrolysis of nitrate or chloride solution wherein the bands correspond in position to the characteristic rutile lines.

The titania hydrate which I employ may be converted into substantially pure rutile in pigmentary condition by calcination. I will hereinafter designate such form of titania hydrate or titanic acid by the arbitrarily selected letter $\gamma$ as a prefix to distinguish it from other forms of titania hydrate or titanic acid which do not have the same characteristic properties.

In the accompanying drawing I have illustrated the position of the bands of this $\gamma$ titanic acid, as well as the positions of the characteristic rutile and characteristic anatase diffraction lines. It is to be understood that the X-ray diffraction pattern of all hydrates appears as bands, rather than as sharp lines such as are obtained from the calcined pigment wherein crystallization is fully developed. In the diagram it will be noted that the bands of the $\gamma$ titania hydrate do not correspond to the atomic planes of the lines for the two crystalline modifications of $TiO_2$ as set forth in Weiser and Milligan, Journal of Physical Chemistry, April, 1934, page 517. The positions are as follows:

| Bands of $\gamma$ titania hydrate | Lines of anatase | Lines of rutile |
|---|---|---|
| Å. U. | Å. U. | Å. U. |
| 5.83 | 3.49 | 3.24 |
| 3.99 | 2.37 | 2.48 |
| 2.145 | 1.883 | 2.29 |
| 2.600 | 1.695 | 2.18 |
| 2.132 | 1.655 | 2.04 |
| 1.888 | 1.477 | 1.685 |
| 1.499 | 1.358 | 1.617 |
| 1.354 | 1.334 | 1.479 |
| 1.177 | 1.261 | 1.448 |
| .956 | 1.161 | 1.351 |
| .868 | 1.044 | 1.240 |
| .743 | 1.015 | 1.167 |
|  | 0.951 | 1.144 |
|  | 0.913 | 1.092 |
|  | 0.892 | 1.037 |
|  | 0.876 |  |
|  | 0.843 |  |
|  | 0.824 |  |
|  | 0.806 |  |

By the term "$\gamma$-titanic acid," as used in this specification and in the claims, I mean a hydrous titanium oxide comprising essentially titanium, hydrogen and oxygen, this material having a lattice structure in which the said elements are so arranged as to substantially conform to the X-ray spacings indicated in the foregoing first column.

This $\gamma$ titania hydrate may be obtained in various ways, but preferably from a solution of titanium-ammonium fluoride, a complex titanium-ammonium fluoride, or titanium tetrafluoride compound, which has been treated with ammonia.

A suitable ammonium fluotitanate in crystalline form may be obtained by crystallization of the titania liquor produced by a fluorine process such as described in the Kliefoth Patent 2,174,920. The titania liquor obtained by attack of ilmenite or other titaniferous ores with a suitable fluorine compound, as described by Kliefoth, is subjected to crystallization, whereby substantially pure ammonium fluotitanate in crystalline form is obtained and separated from the excess of ammonium fluoride, $NH_4F$, and other impurities as iron or other metal impurities.

Merely as examples of a few ways in which such compounds may be converted into a titania hydrate or titanic acid which may be used in making my improved extended pigment, I give the following:

Example 1.—125 pounds of ammonium fluotitanate crystals obtained as above indicated, and containing 50 pounds $TiO_2$, are dissolved in 375 pounds of pure water. This solution is poured into 1500 pounds of 20% aqueous ammonia over a period of 40 minutes, with good agitation. The mixed slurry will contain approximately the following composition:

|  | Pounds | Percentage |
| --- | --- | --- |
| $TiO_2$ | 50 | 2.50 |
| $NH_3$ | 321.5 | 16.075 |
| F | 72 | 3.6 |
| $H_2O$ | 1556.5 | 77.825 |
|  | 2000.0 | 100 |

After 30 minutes the slurry is filtered and the cake of precipitated titania hydrate is washed with 250 pounds of water. The cake may be re-slurried with 250 pounds of water, boiled for one hour, filtered, and washed with 250 pounds of boiling water. The wet cake weighing about 250 pounds may be dried at 110° C., and the weight reduced to 55.6 pounds. The dry cake on analysis shows:

| | Per cent |
| --- | --- |
| $TiO_2$ | 90 |
| $NH_3$ | 4.5 |
| F | 0.1 |
| $H_2O$ | 5.5 |

Example 2.—100 pounds of titanium tetrafluoride solution containing 14.5% $TiO_2$ and 14% F is mixed with 500 pounds of 30% aqueous ammonia. The mixture is agitated for one hour, then filtered and washed with hot water.

Example 3.—50 pounds of slightly soluble $Ti(OH)_2F_2.2NH_4F$ is ball milled for five hours with 200 pounds of 20% aqueous ammonia. The slurry is then filtered and the residue washed with boiling water to reduce the fluorine content to about 0.05%.

Example 4.—I may use a titanium-ammonium fluoride solution made according to the Svendsen Patent No. 2,042,435 and containing 5% of $TiO_2$ and a ratio of about 12 mols of F to 1 of $TiO_2$. Such a solution may contain:

| | Per cent |
| --- | --- |
| $TiO_2$ | 5 |
| F | 14.28 |
| $NH_3$ | 8.52 |

1000 pounds of such solution, and containing 50 pounds $TiO_2$ is slowly added to 1500 pounds of 20% aqueous ammonia over a period of 40 minutes while the temperature is maintained below 40° C. The precipitated hydrate may be filtered and washed, then re-slurried at 100° C. for one hour, and again separated from the liquid. The cake may be dried at 100° C. to yield 56 pounds of dry cake.

The foregoing are merely examples of ways in which one may prepare a titania hydrate suitable for use in making my improved extended pigment.

I preferably employ calcium sulfate as the extender because of its well known desirable properties, which have been taken advantage of in titanium pigments for many years (see Barton Patent No. 1,155,462), but in my improved product a wide variety of other extenders may be employed in finely divided or powdered form, such as natural gypsum, natural or artificial anhydrite, natural or artificial barium sulfate, asbestine, micas, pinites, silica, etc., or mixtures of these extenders.

I do not desire to be limited to any specific proportions of extender and rutile, but for commercial reasons, in view of the difference in cost of the extender and the titanium oxide, and the fact that the hiding power of most commercial extended titanium pigments is somewhat greater than that of the same amount of titanium oxide used without extender, it has been common to use about 70% of extender and about 30% of titanium oxide in making an extended titanium pigment.

My improved pigment having substantially those proportions of extender and titanium oxide, and having the titanium present in the crystalline form of rutile, shows a tinting strength of 575 to 650 when tested according to A. S. T. M. Designation D 332–36, as compared to 450 to 470 for the previously employed pigments of the same percentage composition of calcium sulfate and titanium oxide. The corresponding hiding power for one pound of my improved pigment in linseed oil is 55 to 65 square feet of black surface, when tested according to A. S. T. M. Designation D 406–39, as compared with 48 square feet for the prior pigments. These standard methods of test are given in A. S. T. M. Standards, 1939, part II, Non-metallic materials — constructional, which publication also gives A. S. T. M. Designation D 476–39, Standard specifications for titanium dioxide pigments.

As an example of my improved process, and by which my improved product may be made, one may proceed as follows:

The extender, which is preferably but not necessarily calcium sulfate, and may be natural anhydrite in a fine state of subdivision, is suspended in water to form a slurry, the water having been acidulated with sulfuric acid to such an extent that the optimum ratio of the acid to the titanium oxide which is to be added as γ titania hydrate is about 1:1. The optimum ratio heretofore necessary in the prior art has been about 5:1. The slurry may contain 13.35% of free acid in liquid phase, and include:

| | Pounds |
| --- | --- |
| Extender | 117 |
| $H_2SO_4$ | 57.2 |
| $H_2O$ | 324.5 |

To this amount of acidulated slurry there is added 55.6 pounds of the dry, finely ground γ titania hydrate which, instead of containing a quantity (5 to 9%) of $SO_3$ radical, as in the case of hydrate prepared by the sulfuric process, contains a small amount of ammonia, and is an alkaline type of hydrate instead of an acid type.

A typical analysis of the dry hydrate is:

| | Per cent |
|---|---|
| $TiO_2$ | 90 |
| $NH_3$ | 4.5 |
| F | 0.1 |
| $H_2O$ | 5.5 |

The analysis of the mixture in the foregoing example is:

| | Pounds | Percentage |
|---|---|---|
| Extender | 117 | 21.11 |
| $TiO_2$ | 50 | 9.02 |
| $H_2SO_4$ | 50 | 9.02 |
| $(NH_4)_2SO_4$ | 9.7 | 1.75 |
| $H_2O$ | 327.6 | 59.10 |
| | 554.3 | 100 |

The ammonium sulfate $(NH_4)_2SO_4$ is formed by combination of the ammonia in the hydrate, and some of the sulfuric acid of the slurry. So far as known, this takes no part in the reaction. The mixture may be ball milled to insure smoothness of the slurry and heated with agitation to boiling. The boiling is continued for about two hours. During this period transformation occurs without any substantial solution.

The exact nature of the transformation which is effected by this boiling in the presence of sulfuric acid and the extender is one which changes the hydrate to a form having a band pattern similar to but weaker than that of the hydrate produced by the sulfate process, but the two hydrates differ radically in that the transformed γ titania hydrate on calcination gives rutile, and the hydrate of the sulfate process on calcination gives anatase.

As another example, the mixed slurry to be heated may be made by adding 250 pounds of wet hydrate cake containing hydrate equivalent to 50 pounds of titanium oxide, 117 pounds of $CaSO_4$, 140 pounds of water, and 61.0 pounds of 66° Bé. $H_2SO_4$, and ball milling the mixture, rather than adding the dry hydrate to the slurry of extender.

The hot slurry is then filtered and the residual cake washed with 400 pounds of cold water. The washed cake may be dried prior to calcination, or may be calcined directly, or may be treated prior to calcination with various additional agents, the calcination being for about five hours at about 975° C. As the ratio of the extender to the titanium oxide was 117:50, and the other ingredients are drawn off in drying and calcining, the ratio of the two ingredients of the resulting pigment will be 70:30.

As another example giving the same 70:30 ratio, a mixture of 77.7 grams of γ titanic acid, dry, containing 60 grams of $TiO_2$, 140 grams of dry calcium sulfate, and 380 grams of water, may be mixed to a uniform slurry, and 73.57 grams of 93.2% $H_2SO_4$ (equivalent to 69.55 grams $H_2SO_4$) added. The slurry possesses the following composition:

| | Per cent |
|---|---|
| $TiO_2$ | 8.950 |
| $(NH_4)_2SO_4$ | 1.720 |
| F | .010 |
| $H_2O$ | 59.550 |
| $H_2SO_4$ | 8.950 |
| $CaSO_4$ | 20.82 |
| | 100.000 |

The mixture should be boiled for 2 hours with good agitation, dewatered, for instance by the use of a vacuum filter, and washed to remove mother liquor, and the resulting cake calcined for 4 hours at 975° C. The composite pigment resulting gives a tinting strength of 620, and a brilliant white color.

The amounts of materials employed, the concentrations of the solutions, the solid contents of the slurries, the time of heating, boiling, calcining, etc., the number of washings, and other factors as above given are those which have been found satisfactory in use, but except as indicated, they are not critical, and obviously could be varied in many particulars and through a wide range, to produce the 30:70 ratio of rutile and extender in the product. The various factors may also be varied to produce any other ratio of rutile to extender, such as 10:90, 20:80, 40:60, etc.

The temperature at which the mixture is calcined is about 950° C. to 975° C., but a temperature up to 1000° C. or even 1050° C. does not cause any substantial change in the color, hiding power or tinting strength. At 1200° C. or even 1300° C., the color is lowered to only a slight extent, and is far better than is obtained if anatase be employed instead of rutile.

The acidity of the slurry is given above as 1.0 pound of $H_2SO_4$ for each pound of titanium oxide, but it may be only 0.5 or lower, or the ratio may be even higher. The amount of $H_2SO_4$ should be less than 2.47 pounds for each pound of $TiO_2$, or less than 2 mols for 1 mol of $TiO_2$, and while the acid concentration should not be sufficiently high to cause any substantial dissolving of the hydrate or converting of it to sulfate, it must be sufficiently high to cause dispersion of the hydrate. This concentration may be from 6 to 15% $H_2SO_4$ in the liquid, and should not very substantially exceed that percentage. As the titanium compound is not in solution in the slurry but only dispersed, the recovery of titania is substantially 100% of that added.

The use of ammonia for the treatment of the titanium fluorine compound to produce the desired form of the hydrate is not essential, as other alkalies may be used. Using X-ray diffraction pattern methods as a means of identifying γ titanic acid, it has been found that the desired material may be obtained by each of the following reactions:

Ammonium fluotitanate with ammonia or sodium or potassium hydroxide; ammonium fluotitanate in ammonium fluoride solution with ammonia or sodium hydroxide; potassium fluotitanate and potassium hydroxide or ammonia; solution of titanium tetrafluoride with ammonia or sodium hydroxide; the compound $$Ti(OH)_2F_2.3NH_4F$$

with ammonia; the compound $Ti(OH)_2F_2.2NH_4F$ with ammonia; titanium nitrate in water or nitric acid solution with ammonia; and various other titanium compounds with any suitable alkali or equivalent base may be employed. The best results seem to be obtained by the use of an ammonium-titanium fluorine compound with ammonia.

Having thus described my invention, what I claim as new and desire to secure by Letters Patent is:

1. The process of making a titanium containing pigment, which includes the steps of forming a slurry of an extender and a titania hydrate both in solid form, in water containing a quantity of sulfuric acid in proportion of less than 2.47 $H_2SO_4$ to 1 part $TiO_2$ by weight, said hydrate showing on X-ray analysis the pattern characteristic of $\gamma$-titanic acid, boiling said slurry and separating the mixed solids from the acidified water.

2. The process of making a rutile containing pigment, which includes the steps of forming a slurry of an extender and a titania hydrate both in solid, finely divided form, in water containing sulfuric acid in proportion by weight of less than 2.47 parts $H_2SO_4$ to 1 part $TiO_2$, said hydrate showing on X-ray analysis the pattern characteristic of $\gamma$-titanic acid, boiling said slurry, separating the mixed solids from the acidified water, and calcining.

3. The process of making a titanium containing pigment, which includes the steps of forming a slurry of an extender and a titania hydrate in solid, finely divided form, in water containing sulfuric acid in quantity less than 2 mols of $H_2SO_4$ to 1 mol of $TiO_2$ said hydrate showing on X-ray analysis the pattern characteristic of $\gamma$-titanic acid, boiling said slurry, separating the mixed solids from the acidified water, washing to remove residual acid, and calcining to convert the hydrate into rutile in the presence of the extender.

4. The process of making a pigment composed essentially of an extender and rutile, which includes the steps of forming a slurry of the extender and a titania hydrate containing a small amount of alkali, in water containing an amount of acid more than sufficient to neutralize the alkali but less than 2.47 parts by weight of $H_2SO_4$ to 1 part $TiO_2$, said hydrate showing on X-ray analysis the pattern characteristic of $\gamma$-titanic acid, boiling the slurry, and thereafter separating the mixed solids from the acidified water.

5. The process of making a pigment composed essentially of an extender and rutile, which includes the steps of forming a slurry of the extender and a titania hydrate containing a small amount of alkali, in water containing an amount of acid, the ratio of acid to titanium oxide by weight being substantially less than 2.47:1, said hydrate showing on X-ray analysis the pattern characteristic of $\gamma$-titanic acid, boiling the slurry, and thereafter separating the mixed solids from the acidified water.

6. The process of making a pigment composed of an extender and rutile, which includes forming a slurry of $\gamma$-titanic acid containing a small amount of ammonia, calcium sulfate, water and an amount of sulfuric acid substantially equal in weight to that of the titania of said $\gamma$-titanic acid, boiling the slurry for about 2 hours with agitation, dewatering on a vacuum filter, washing to remove mother liquor, and calcining the filter cake for about 4 hours at about 975° C.

7. The method of forming a pigment comprising rutile and an extender, which includes forming a slurry of calcium sulfate and a titania hydrate formed by precipitation of an ammonium titanium fluoride compound with ammonia, and containing a small amount of alkali, said slurry being formed in water containing sulfuric acid, the ratio of $H_2SO_4$ to titanium oxide by weight being about 1:1, and more than sufficient to neutralize said alkali, boiling the slurry, separating the mixed solids in finely divided condition from the acidified water, and calcining the solids to convert the titania hydrate into rutile, in the presence of the extender.

8. The process of forming a pigment, which includes treating a titanium fluorine compound with an alkali to form a compound composed essentially of titanium, hydrogen and oxygen and having a crystal structure characterized by exhibiting upon X-ray analysis a diffraction pattern composed of bands spaced at substantially the following positions on a scale calibrated in Angstrom units: 5.83, 3.99, 3.145, 2.600, 2.132, 1.888, 1.499, 1.354, 1.177, .956, .868, .743, forming a slurry of said hydrous titanium oxide and an extender in water acidified with sulfuric acid, the ratio of $H_2SO_4$ to $TiO_2$ by weight being less than 2.47:1, boiling the slurry, separating the finely subdivided solids from the acidified water, and calcining to convert the hydrous titanium oxide into rutile in the presence of the extender.

9. In the preparation of an extended pigment, the steps of adding an aqueous solution of a complex ammonium titanium fluoride compound to an excess of aqua ammonia, separating the precipitated titania hydrate, forming a slurry of said hydrate and an extender in water containing a quantity of sulfuric acid less than 2.47 parts by weight of $H_2SO_4$ to 1 part $TiO_2$, boiling the slurry, and thereafter separating the finely divided mixed hydrate and extender in finely divided solid form.

10. The process of making a pigment composed essentially of rutile and an extender, which includes the steps of forming an aqueous solution of ammonia fluotitanate, contacting said solution with an excess of aqua ammonia, separating, washing and boiling the resulting titania hydrate, forming a slurry of said hydrate and the extender in water containing an amount of sulfuric acid not in excess of 2.47 parts per part of $TiO_2$ by weight, boiling, separating the mixed extender and titania hydrate, washing, and calcining at 800° C. to 1200° C.

11. The process of making a pigment composed essentially of rutile and an extender, which includes the steps of forming an aqueous solution of ammonia fluotitanate, contacting said solution with an excess of aqua ammonia, separating, boiling and washing the resulting titania hydrate, forming a slurry of said hydrate and the extender in water containing an amount of sulfuric acid not in excess of 2.47 parts per part of $TiO_2$ by weight, boiling, separating the mixed extender and titanium hydrate, washing, and calcining at 950° C. to 975° C.

ANDREW T. McCORD.